(12) United States Patent
Zheng et al.

(10) Patent No.: US 11,552,580 B1
(45) Date of Patent: Jan. 10, 2023

(54) LEVITATION, GUIDANCE AND PROPULSION INTEGRATED SUPERCONDUCTING MAGNETIC LEVITATION TRAIN

(71) Applicant: Southwest Jiaotong University, Chengdu (CN)

(72) Inventors: Jun Zheng, Chengdu (CN); Jing Li, Chengdu (CN); Yixing Du, Chengdu (CN); Zigang Deng, Chengdu (CN); Peng Pang, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 0 days.

(21) Appl. No.: 17/539,504

(22) Filed: Dec. 1, 2021

(51) Int. Cl.
*H02N 15/00* (2006.01)
*H01F 6/06* (2006.01)
*H01F 6/04* (2006.01)

(52) U.S. Cl.
CPC .............. *H02N 15/00* (2013.01); *H01F 6/04* (2013.01); *H01F 6/06* (2013.01)

(58) Field of Classification Search
CPC .............. H02N 15/00; H01F 6/00; H01F 6/06
See application file for complete search history.

(56) References Cited

U.S. PATENT DOCUMENTS

| 4,797,386 A | * | 1/1989 | Gyorgy | H02N 15/04 505/211 |
| 5,668,090 A | * | 9/1997 | Kalsi | H01F 6/00 310/12.24 |

FOREIGN PATENT DOCUMENTS

CN 106828184 A 6/2017

* cited by examiner

*Primary Examiner* — Mohamad A Musleh

(57) ABSTRACT

A superconducting magnetic levitation train includes a frame, an arm, a first support member, a Dewar, a permanent magnet track, an iron core, a coil, a DC power supply system, and a second support member. the arm is arranged on a bottom of the frame; the Dewar 4 with bulk superconductors or superconducting magnets inside is arranged on the bottom of the frame 1; a bottom of the first support member and the second support member is fixedly arranged on a ground; the permanent magnet track is arranged on the first support member; the iron core is arranged on the second support member; the coil is sleeved on the iron core; and levitation, guidance and propulsion integrated superconducting magnetic levitation train further comprises a direct current (DC) power supply system to supply power to the coil.

6 Claims, 4 Drawing Sheets

LEVITATION, GUIDANCE AND PROPULSION INTEGRATED SUPERCONDUCTING MAGNETIC LEVITATION TRAIN

TECHNICAL FIELD

This application relates to rail transit, and in particular to a levitation, guidance and propulsion integrated superconducting magnetic levitation train.

BACKGROUND

The existing superconducting magnetic levitation trains are levitated by a reaction force generated by the diamagnetism of a superconductor and a magnetic track, and then driven by a linear motor. However, in the prior art, the integration of levitation, guidance and propulsion is not satisfactory. The levitation and guidance of the traditional superconducting magnetic levitation trains are enabled by means of the interaction of the superconductor with the magnetic field on an upper surface of the magnetic track, and the propulsion is performed using an independent linear motor. In view of this, it is required to additionally lay a three-phase winding along the line, leading to high cost. Moreover, the magnetic field on the lower surface of the magnetic track has not been effectively used, leading to poor magnetic field utilization rate.

SUMMARY

An object of the present disclosure is to provide a levitation, guidance and propulsion integrated superconducting magnetic levitation (maglev) train to overcome the problems in the prior art.

The technical solutions of the present disclosure are described as follows.

The present disclosure provides a levitation, guidance and propulsion integrated superconducting magnetic levitation train, comprising:

a frame, an arm, a first support member, a Dewar, a permanent magnet track, an iron core, a coil, a DC power supply system and a second support member. The arm is arranged on a bottom of the frame; bulk superconductors or superconducting magnets are provided inside the Dewar; the Dewar is arranged on the bottom of the frame; a bottom of the first support member and the second support member is fixedly arranged on a ground; the permanent magnet track is arranged on the first support member; the iron core is arranged on the second support member; the coil is sleeved on the iron core; and a positive electrode and a negative electrode of the DC power supply system are respectively connected to both ends of the coil.

In an embodiment, the permanent magnet track is a double-layer track consisting of upper and lower permanent magnets, where the upper and lower permanent magnets are different in the magnetization method.

In an embodiment, the number of the permanent magnet track is two; one side of the first support member is provided with one of two permanent magnet tracks, and the other side of the first support member is provided with the other of the two permanent magnet tracks; the two permanent magnet tracks are fixedly connected to the first support member; the number of the arm is two, and two arms are respectively arranged on both sides of the bottom of the frame; the number of the Dewar is two, and two Dewars are respectively arranged on the both sides of the bottom of the frame; the two permanent magnet tracks are respectively arranged below the two Dewars; the number of the iron core is two, and two iron cores are respectively arranged below the two permanent magnet tracks; the two iron cores are respectively arranged on both sides of the first support member; and the number of the coil is four, and four coils are respectively sleeved on the two iron cores.

In an embodiment, the iron core comprises a first iron core and a second iron core, the first iron core is connected to the second iron core end to end; the coil comprises a first conducting wire and a second conducting wire; the first conducting wire comprises a first vertical portion, a first horizontal portion and a second vertical portion that are sequentially connected; the second conducting wire comprises a third vertical portion, a second horizontal portion and a fourth vertical portion that are sequentially connected; the first iron core is arranged between the first vertical portion and the second vertical portion, and the second iron core is arranged between the third vertical portion and the fourth vertical portion; the first horizontal portion is arranged directly above the first iron core, and the second horizontal portion is arranged directly above the second iron core; an end of the first vertical portion is connected to a positive electrode of the DC power supply system, and an end of the fourth vertical portion is connected to the positive electrode of the DC power supply system; an end of the second conducting wire is electrically connected to an end of the first conducting wire, and is connected to a negative electrode of the DC power supply system.

In an embodiment, a shielding layer is arranged outside the first vertical portion, the second vertical portion, the third vertical portion and the fourth vertical portion; and the shielding layer has a three-layer structure consisting of a first iron layer, an aluminum layer and a second iron layer from inside to outside.

In an embodiment, the levitation, guidance and propulsion integrated superconducting magnetic levitation train further comprises a sliding electrical contact device; the sliding electrical contact device includes a first sliding electrical contact device and a second sliding electrical contact device; the first sliding electrical contact device is arranged below the first iron core, and the first sliding electrical contact device is penetratedly arranged on the second support member; one end of the first sliding electrical contact device is connected to the second vertical portion and the third vertical portion, and the other end of the first sliding electrical contact device is connected to the negative electrode of the DC power supply system; the second sliding electrical contact device is penetratedly arranged on the first support member; and one end of the second sliding electrical contact device is connected to the fourth vertical portion, and the other end of the second sliding electrical contact device is connected to the positive electrode of the DC power supply system.

Compared to the prior art, the present disclosure has the following beneficial effects.

In the levitation, guidance and propulsion integrated superconducting magnetic levitation train provided herein, the levitation-guidance function is realized by using the interaction between the superconductor and the magnetic field formed at the upper surface of the permanent magnet track, and the propulsion is enabled by the magnetic field formed at the lower surface of the permanent magnet track and the energized coil. Based on this, the magnetic levitation train of the present disclosure realizes the integration of levitation, guidance and propulsion, which facilitates reducing the manufacturing and operation cost and improving the utilization rate of the magnetic energy of the permanent magnet track.

Other features and advantages of the present disclosure will be described below, and part of them will become obvious from the following description, or can be understood by implementing the embodiments of the present disclosure. The purpose and other advantages of the present disclosure can be understood through the description, claims, and structures specifically illustrated in the drawings.

BRIEF DESCRIPTION OF THE DRAWINGS

In order to explain the technical solutions of the embodiments of the present disclosure more clearly, the drawings that need to be used in the embodiments will be briefly described below. It should be understood that presented in the drawings are only some embodiments of the present disclosure, which are not intended to limit the scope of the disclosure. It should be noted that other related drawings can be obtained by those of ordinary skill in the art from these drawings without paying creative effort.

Figure 1:
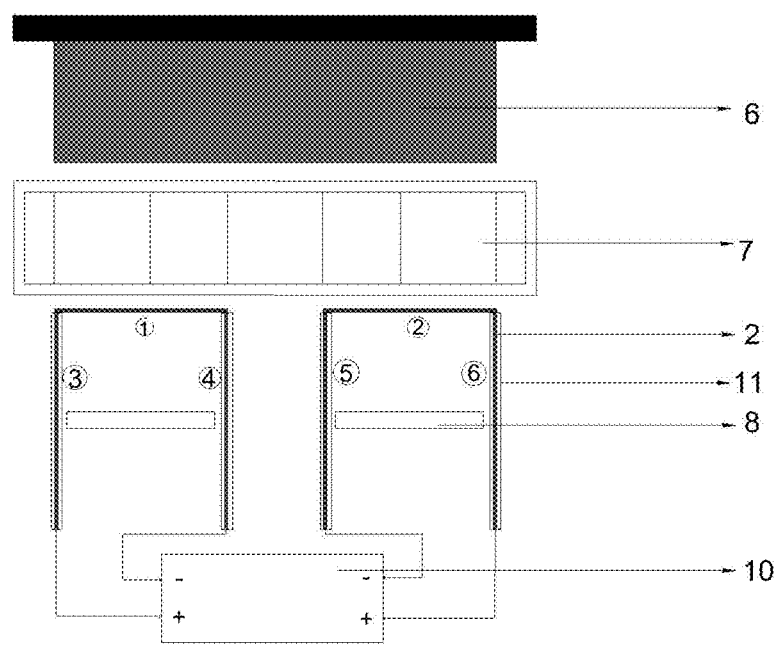
FIG. 1 schematically illustrates a principle of a levitation, guidance and propulsion integrated superconducting magnetic levitation train according to an embodiment of the present disclosure.

In the drawings: 1, frame; 2, first support member; 3, arm; 4, Dewar; 5, permanent magnet track; 6, iron core; 7, coil; 8, DC power supply system; 9, sliding electrical contact device; 10, second support member; and 11, shielding layer.

DETAILED DESCRIPTION OF EMBODIMENTS

The disclosure will be described completely and clearly below with reference to the accompanying drawings and embodiments to make the object, technical solutions, and beneficial effects of the present disclosure clearer. Obviously, provided below are merely some embodiments of the disclosure. The components described and illustrated in the drawings herein can be arranged and designed in various configurations. Therefore, the embodiments provided in the accompanying drawings are merely illustrative, and are not intended to limit the scope of the present disclosure. Based on the embodiments of the present disclosure, all other embodiments obtained by those skilled in the art without paying any creative effort shall fall within the scope of the present disclosure.

It should be noted that similar reference numerals or letters indicate similar elements in the following drawings. Therefore, once a certain element is defined in one drawing, it does not need to be further defined and explained in subsequent drawings. At the same time, as used herein, the terms "first", "second", etc. are only used to distinguish the elements referred to, and should not be understood as indicating or implying relative importance.

Embodiment 1

Figure 2:
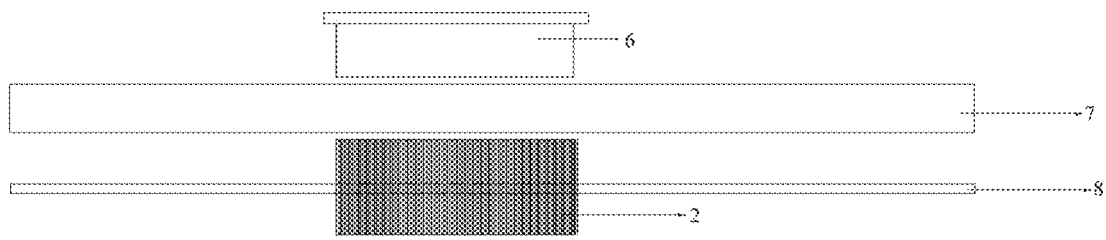
FIG. 2 is a schematic diagram of structures of a Dewar, a permanent magnet track, an iron core and a coil according to an embodiment of the present disclosure.
Figure 3:
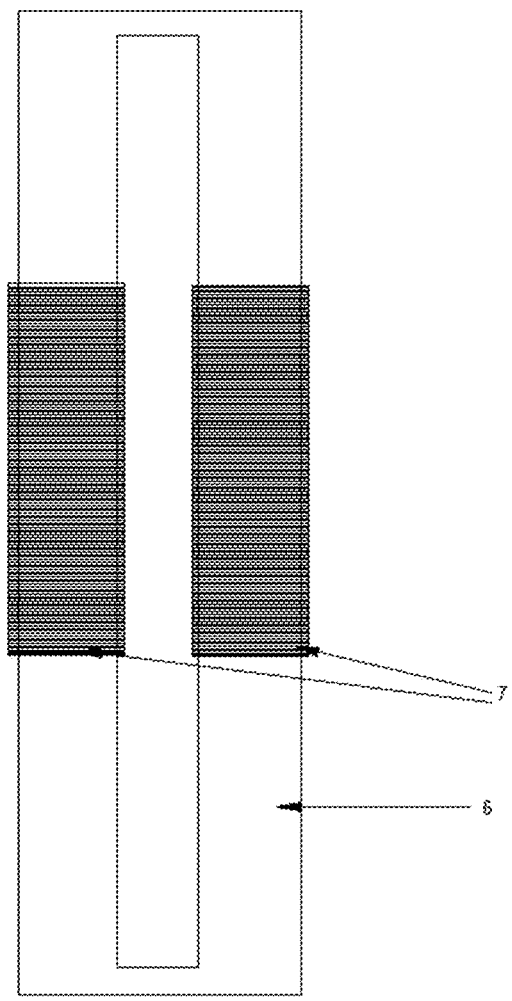
FIG. 3 is a top view of a combination of the iron core and the coil according to an embodiment of the present disclosure.
Figure 4:
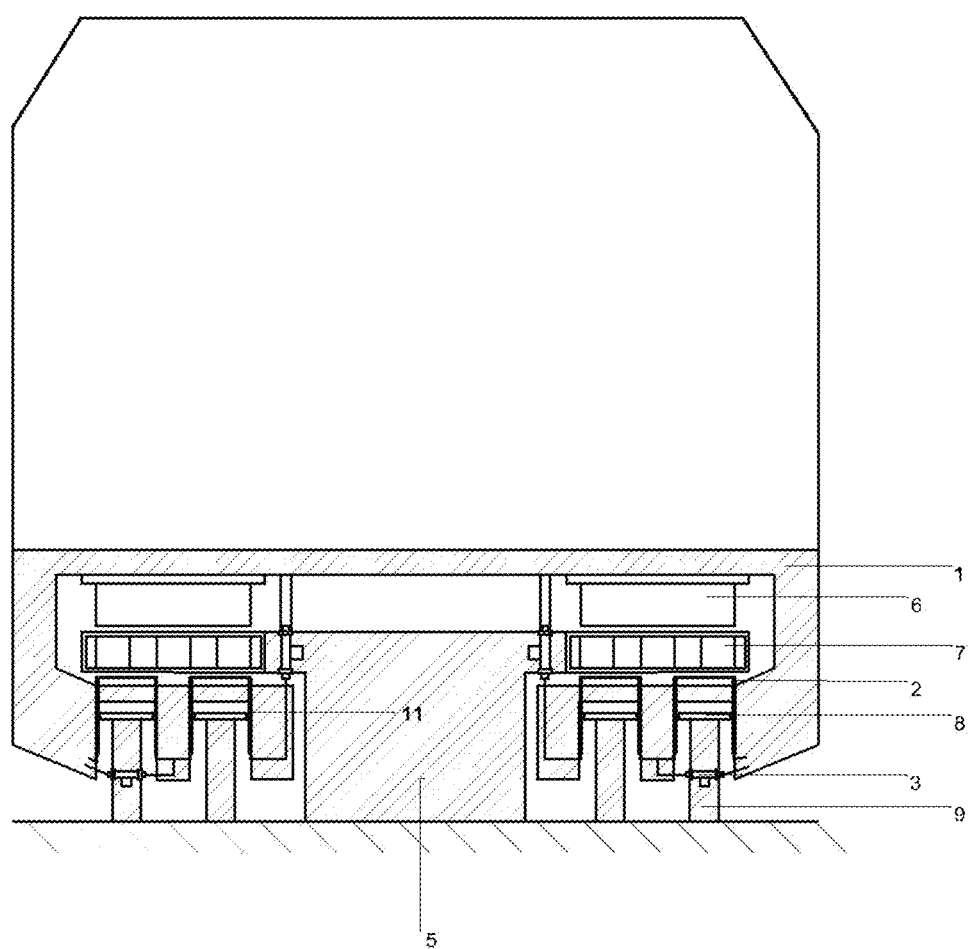
FIG. 4 is a cross-sectional view of the levitation, guidance and propulsion integrated superconducting magnetic levitation train according to an embodiment of the present disclosure.

As shown in FIGS. 1-4, an embodiment of the present disclosure provides a levitation, guidance and propulsion integrated superconducting magnetic levitation train, which includes a frame 1, an arm 3, a first support member 2, a Dewar 4, a permanent magnet track 5, an iron core 6, a coil 7, a DC power supply system 8, and a second support member 10. The arm 3 is arranged on a bottom of the frame 1; bulk superconductors or superconducting magnets are provided inside the Dewar 4; the Dewar 4 is arranged on the bottom of the frame 1; a bottom of the first support member 2 and the second support member 10 is fixedly arranged on a ground; the permanent magnet track 5 is arranged on the first support member 2; the iron core 6 is arranged on the second support member 10; the coil 7 is sleeved on the iron core 6; and a positive electrode and a negative electrode of the DC power supply system 8 are respectively connected to both ends of the coil 7.

Compared with the traditional high-temperature superconducting magnetic levitation train, this embodiment avoids using the traditional stator winding laid along the line. The present disclosure realizes functions of levitation and guidance through the interaction between the superconductor and an upper surface magnetic field of the permanent magnet track 5, and realizes the propulsion function through a lower surface magnetic field of the permanent magnet track 5 and an energized coil 7 sleeved on the iron core 6. The permanent magnet track 5 of the superconducting magnetic levitation train provides a magnetic field source for simultaneously realizing functions of levitation, guidance and driving, which improves the magnetic energy utilization rate of the permanent magnet track 5, and truly enables the integration of levitation, guidance and propulsion of the high-temperature superconducting magnetic levitation system.

Embodiment 2

As shown in FIGS. 1-4, an embodiment of the present disclosure provides a levitation, guidance and propulsion integrated superconducting magnetic levitation train, which includes a frame 1, an arm 3, a first support member 2, a Dewar 4, a permanent magnet track 5, an iron core 6, a coil 7, a DC power supply system 8, and a second support member 10. The arm 3 is arranged on a bottom of the frame 1; the Dewar 4 with bulk superconductors or superconducting magnets inside is arranged on the bottom of the frame 1; a bottom of the first support member 2 and the second support member 10 is fixedly arranged on a ground; the permanent magnet track 5 is arranged on the first support member 2; the iron core 6 is arranged on the second support member 10; the coil 7 is sleeved on the iron core 6; and a positive electrode and a negative electrode of the DC power supply system 8 are respectively connected to both ends of the coil 7.

In an embodiment, the permanent magnet track 5 is a double-layer track consisting of upper and lower permanent magnets, where the upper and lower permanent magnets are different in the magnetization method.

The technical effects of this embodiment are basically the same as those of the Embodiment 1. For a brief description, illustrated herein are only the different technical effects. The superconducting magnetic levitation train of this embodiment further includes a double-layer permanent magnet track 5 consisting of the upper and lower permanent magnets, and the magnetization method of the upper and lower permanent magnets can be reasonably designed to meet different magnetic field requirements for the levitation, guidance and driving system, and the integration degree of the train is further improved.

Embodiment 3

Referring to an embodiment FIGS. 1-4, a levitation, guidance and propulsion integrated superconducting magnetic levitation train is provided, which includes a frame 1, an arm 3, a first support member 2, a Dewar 4, a permanent magnet track 5, an iron core 6, a coil 7, a DC power supply system 8, and a second support member 10. The arm 3 is arranged on a bottom of the frame 1; the Dewar 4 with bulk superconductors or superconducting magnets inside is arranged on the bottom of the frame 1; a bottom of the first support member 2 and the second support member 10 is fixedly arranged on a ground; the permanent magnet track 5 is arranged on the first support member 2; the iron core 6 is arranged on the second support member 10; the coil 7 is sleeved on the iron core 6; and a positive electrode and a negative electrode of the DC power supply system 8 are respectively connected to both ends of the coil 7.

In an embodiment, the permanent magnet track 5 is a double-layer track consisting of upper and lower permanent magnets, where the upper and lower permanent magnets are different in the magnetization method.

In an embodiment, there are two permanent magnet tracks 5, which are respectively arranged on both sides of the first support member 2, and are fixedly connected to the first support member 2. There are two arms 3, which are respectively arranged on both sides of the bottom of the frame 1. There are two Dewars 4, which are respectively arranged on both sides of the bottom of the frame 1. The two permanent magnet tracks 5 are respectively arranged below the two Dewars 4. There are two iron cores 6, which are respectively arranged below the two permanent magnet tracks 5, and are respectively arranged on both sides of the first support member 2. There are four coils 7, which are respectively sleeved on the two iron cores.

The technical effects of this embodiment are basically the same as those of the Embodiment 2. For a brief description, illustrated herein are only the different technical effects. In this embodiment, there are two permanent magnet tracks 5, two arms 3, two Dewars 4, two iron cores 6, and four coils 7, which are respectively arranged on both sides of the first support member 2. The train has an axisymmetrical mechanical structure, which makes the force on the magnetic levitation train more uniform, strengthening the steering stability.

Embodiment 4

As shown in FIGS. 1-4, this embodiment provides a levitation, guidance and propulsion integrated superconducting magnetic levitation train is provided, which includes a frame 1, an arm 3, a first support member 2, a Dewar 4, a permanent magnet track 5, an iron core 6, a coil 7, a DC power supply system 8, and a second support member 10. The arm 3 is arranged on a bottom of the frame 1; the Dewar 4 with bulk superconductors or superconducting magnets inside is arranged on the bottom of the frame 1; a bottom of the first support member 2 and the second support member 10 is fixedly arranged on a ground; the permanent magnet track 5 is arranged on the first support member 2; the iron core 6 is arranged on the second support member 10; the coil 7 is sleeved on the iron core 6; and a positive electrode and a negative electrode of the DC power supply system 8 are respectively connected to both ends of the coil 7.

In an embodiment, the iron core 6 includes a first iron core and a second iron core. The first iron core is connected to the second iron core end to end. The coil 7 includes a first conducting wire and a second conducting wire. The first conducting wire includes a first vertical portion, a first horizontal portion, and a second vertical portion that are sequentially connected. The second conducting wire includes a third vertical portion, a second horizontal portion, and a fourth vertical portion that are sequentially connected. The first iron core is arranged between the first vertical portion and the second vertical portion. The second iron core is arranged between the third vertical portion and the fourth vertical portion. The first horizontal portion is arranged directly above the first iron core, and the second horizontal portion is arranged directly above the second iron core; an end of the first vertical portion is connected to a positive electrode of the DC power supply system, and an end of the fourth vertical portion is connected to the positive electrode of the DC power supply system; an end of the second conducting wire is electrically connected to an end of the first conducting wire, and is connected to a negative electrode of the DC power supply system.

The technical effects of this embodiment are basically the same as those of the Embodiment 1. For a brief description, illustrated herein are only the different technical effects. The iron core 6 includes the first iron core and the second iron core, and the first iron core is connected to the second iron core end to end. The iron core changes the magnetic field distribution, which leads to the generation of a longitudinal fluctuating magnetic field, improving the utilization rate of magnetic energy and providing magnetic energy for a driving system.

Embodiment 5

As shown in FIGS. 1-4, this embodiment provides a levitation, guidance and propulsion integrated superconducting magnetic levitation train is provided, which includes a frame 1, an arm 3, a first support member 2, a Dewar 4, a permanent magnet track 5, an iron core 6, a coil 7, a DC power supply system 8, and a second support member 10. The arm 3 is arranged on a bottom of the frame 1; the Dewar 4 with bulk superconductors or superconducting magnets inside is arranged on the bottom of the frame 1; a bottom of the first support member 2 and the second support member 10 is fixedly arranged on a ground; the permanent magnet track 5 is arranged on the first support member 2; the iron core 6 is arranged on the second support member 10; the coil 7 is sleeved on the iron core 6; and a positive electrode and a negative electrode of the DC power supply system 8 are respectively connected to both ends of the coil 7.

In an embodiment, the iron core 6 includes a first iron core and a second iron core connected end to end. The coil 7 includes a first conducting wire and a second conducting wire. The first conducting wire includes a first vertical portion, a first horizontal portion, and a second vertical portion, and the second conducting wire includes a third vertical portion, a second horizontal portion, and a fourth vertical portion. The first iron core is arranged between the first vertical portion and the second vertical portion, and the second iron core is arranged between the third vertical portion and the fourth vertical portion. The first horizontal portion is arranged directly above the first iron core, and the second horizontal portion is arranged directly above the second iron core; an end of the first vertical portion is connected to a positive electrode of the DC power supply system, and an end of the fourth vertical portion is connected to the positive electrode of the DC power supply system; an end of the second conducting wire is electrically connected to an end of the first conducting wire, and is connected to a negative electrode of the DC power supply system.

In an embodiment, a shielding layer is arranged outside the first vertical portion, the second vertical portion, the third vertical portion and the fourth vertical portion. The shielding layer is composed of three layers of materials, respectively an iron layer, an aluminum layer, and an iron layer from inside to outside.

The technical effects of this embodiment are basically the same as those of the Embodiment 4. For a brief description, only the different technical effects are illustrated herein. With the help of the shielding layer, the first vertical portion, the second vertical portion, the third vertical portion and the fourth vertical portion are shielded from being affected by the magnetic field, reducing the resistance applied to the coil 7 and improving the driving force.

Embodiment 6

As shown in FIGS. 1-4, this embodiment provides a levitation, guidance and propulsion integrated superconducting magnetic levitation train is provided, which includes a frame 1, an arm 3, a first support member 2, a Dewar 4, a permanent magnet track 5, an iron core 6, a coil 7, a DC power supply system 8, and a second support member 10. The arm 3 is arranged on a bottom of the frame 1; the Dewar 4 with bulk superconductors or superconducting magnets inside is arranged on the bottom of the frame 1; a bottom of the first support member 2 and the second support member 10 is fixedly arranged on a ground; the permanent magnet track 5 is arranged on the first support member 2; the iron core 6 is arranged on the second support member 10; the coil 7 is sleeved on the iron core 6; and a positive electrode and a negative electrode of the DC power supply system 8 are respectively connected to both ends of the coil 7.

In an embodiment, the iron core 6 includes a first iron core and a second iron core connected end to end. The coil 7 includes a first conducting wire and a second conducting wire. The first conducting wire includes a first vertical portion, a first horizontal portion, and a second vertical portion that are sequentially connected, and the second conducting wire includes a third vertical portion, a second horizontal portion, and a fourth vertical portion that are sequentially connected. The first iron core is arranged between the first vertical portion and the second vertical portion, and the second iron core is arranged between the third vertical portion and the fourth vertical portion. The first horizontal portion is arranged directly above the first iron core, and the second horizontal portion is arranged directly above the second iron core; an end of the first vertical portion is connected to a positive electrode of the DC power supply system, and an end of the fourth vertical portion is connected to the positive electrode of the DC power supply system; an end of the second conducting wire is electrically connected to an end of the first conducting wire, and is connected to a negative electrode of the DC power supply system.

In an embodiment, levitation, guidance and propulsion integrated superconducting magnetic levitation train further includes a sliding electrical contact device 9. The sliding electrical contact device 9 includes a first sliding electrical contact device and a second sliding electrical contact device. The first sliding electrical contact device is arranged below the first iron core, and is penetratedly arranged on the second support member 10. One end of the first sliding electrical contact device is connected to the second vertical portion and the third vertical portion, and the other end of the first sliding electrical contact device is connected to the negative electrode of the DC power supply system 8. The second sliding electrical contact device is penetratedly arranged on the first support member 2. One end of the second sliding electrical contact device is connected to the fourth vertical portion, and the other end of the second sliding electrical contact device is connected to the positive electrode of the DC power supply system 8.

The technical effects of this embodiment are basically the same as those of the Embodiment 5. For a brief description, only the different technical effects are illustrated herein. The first sliding electrical contact device and the second sliding electrical contact device are in electrical connection, and both ends of which are an elastic structure to realize contact DC power supply system between the coil 7 and the DC power supply system 8.

Described above are only preferred embodiments of the present disclosure and are not intended to limit the present disclosure. It should be understood that any modifications, replacements and improvements made by those skilled in the art without departing from the spirit and scope of the present disclosure should fall within the scope of the present disclosure defined by the appended claims.

What is claimed is:

1. A levitation, guidance and propulsion integrated superconducting magnetic levitation train, comprising:
    a frame;
    an arm;
    a first support member;
    a second support member;
    a permanent magnet track;
    a Dewar;
    an iron core; and
    a coil;
    wherein the arm is arranged on a bottom of the frame; bulk superconductors or superconducting magnets are provided inside the Dewar; the Dewar is arranged on the bottom of the frame; a bottom of the first support member and the second support member is fixedly arranged on a ground; the permanent magnet track is arranged on the first support member; the iron core is arranged on the second support member; the coil is sleeved on the iron core; and levitation, guidance and propulsion integrated superconducting magnetic levitation train further comprises a direct current (DC) power supply system to supply power to the coil.

2. The levitation, guidance and propulsion integrated superconducting magnetic levitation train of claim 1, wherein the permanent magnet track is a double-layer track consisting of upper and lower permanent magnets; the upper and lower permanent magnets are different in the magnetization method.

3. The levitation, guidance and propulsion integrated superconducting magnetic levitation train of claim 2, wherein the number of the permanent magnet track is two; one side of the first support member is provided with one of two permanent magnet tracks, and the other side of the first support member is provided with the other of the two permanent magnet tracks; the two permanent magnet tracks are fixedly connected to the first support member; the number of the arm is two, and two arms are respectively arranged on both sides of the bottom of the frame; the number of the Dewar is two, and two Dewars are respectively arranged on the both sides of the bottom of the frame; the two permanent magnet tracks are respectively arranged below the two Dewars; the number of the iron core is two, and two iron cores are respectively arranged below the two permanent magnet tracks; the two iron cores are respectively arranged on both sides of the first support member; and the number of the coil is two, and two coils are respectively sleeved on the two iron cores.

4. The levitation, guidance and propulsion integrated superconducting magnetic levitation train of claim 1, wherein the iron core comprises a first iron core and a second iron core; the first iron core is connected to the second iron core end to end; the coil comprises a first conducting wire and a second conducting wire; the first conducting wire comprises a first vertical portion, a first horizontal portion and a second vertical portion; the second conducting wire comprises a third vertical portion, a second horizontal portion and a fourth vertical portion; the first iron core is arranged between the first vertical portion and the second vertical portion, and the second iron core is arranged between the third vertical portion and the fourth vertical portion; the first horizontal portion is arranged directly above the first iron core, and the second horizontal portion is arranged directly above the second iron core; an end of the first vertical portion is connected to a positive electrode of the DC power supply system, and an end of the fourth vertical portion is connected to the positive electrode of the DC power supply system; an end of the second conducting wire is electrically connected to an end of the first conducting wire, and is connected to a negative electrode of the DC power supply system.

5. The levitation, guidance and propulsion integrated superconducting magnetic levitation train of claim 4, wherein a shielding layer is arranged outside the first vertical portion, the second vertical portion, the third vertical portion and the fourth Vertical portion; and the shielding layer has a three-layer structure consisting of a first iron layer, an aluminum layer and a second iron layer from inside to outside.

6. The levitation, guidance and propulsion integrated superconducting magnetic levitation train of claim 1, wherein the DC power supply system comprises a sliding electrical contact device; the sliding electrical contact device comprises a first sliding electrical contact device and a second sliding electrical contact device; the first sliding electrical contact device is arranged below the first iron core, and the first sliding electrical contact device is penetratedly arranged on the second support member; one end of the first sliding electrical contact device is connected to the second vertical portion and the third vertical portion, and the other end of the first sliding electrical contact device is connected to the negative electrode of the DC power supply system; the second sliding electrical contact device is penetratedly arranged on the first support member; and one end of the second sliding electrical contact device is connected to the fourth vertical portion, and the other end of the second sliding electrical contact device is connected to the positive electrode of the DC power supply system.

\* \* \* \* \*